United States Patent
Williamson (10) Patent No.: US 10,102,262 B2
(45) Date of Patent: Oct. 16, 2018

(54) CREATING REPORTS USING DIMENSION TREES

(75) Inventor: Eric J. Williamson, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 1098 days.

(21) Appl. No.: 12/202,087

(22) Filed: Aug. 29, 2008

(65) Prior Publication Data

US 2010/0057756 A1 Mar. 4, 2010

(51) Int. Cl.
*G06F 7/00* (2006.01)
*G06F 17/00* (2006.01)
*G06F 17/30* (2006.01)

(52) U.S. Cl.
CPC .............. *G06F 17/30572* (2013.01)

(58) Field of Classification Search
CPC ................................................ G06F 17/30572
USPC .............................................. 707/607, 999.1
See application file for complete search history.

(56) References Cited

U.S. PATENT DOCUMENTS

| | | | |
|---|---|---|---|
| 5,278,951 A | 1/1994 | Camacho et al. | |
| 5,657,437 A | 8/1997 | Bishop et al. | |
| 5,819,273 A | 10/1998 | Vora et al. | |
| 5,850,388 A | 12/1998 | Anderson et al. | |
| 6,092,050 A | 7/2000 | Lungren et al. | |
| 6,377,287 B1 | 4/2002 | Hao et al. | |
| 6,581,068 B1 | 6/2003 | Bensoussan et al. | |
| 6,609,120 B1 * | 8/2003 | Honarvar | G06Q 10/06 |
| 6,611,846 B1 | 8/2003 | Stoodley | |
| 6,775,675 B1 | 8/2004 | Nwabueze et al. | |
| 7,181,422 B1 | 2/2007 | Philip et al. | |
| 7,181,438 B1 | 2/2007 | Szabo | |
| 7,225,113 B2 | 5/2007 | Rothschild | |
| 7,337,163 B1 | 2/2008 | Srinivasan et al. | |
| 7,441,197 B2 | 10/2008 | Tschiegg et al. | |
| 7,571,182 B1 | 8/2009 | Eddy | |
| 7,631,020 B1 | 12/2009 | Wei et al. | |
| 7,639,609 B2 | 12/2009 | Bolt et al. | |
| 7,698,349 B2 | 4/2010 | Hulen et al. | |
| 7,716,257 B2 | 5/2010 | Thomson et al. | |
| 7,734,617 B2 | 6/2010 | de Souza | |
| 7,752,301 B1 * | 7/2010 | Maiocco | G06F 15/173 709/224 |
| 7,800,613 B2 | 9/2010 | Hanrahan et al. | |
| 7,801,929 B2 | 9/2010 | Williams et al. | |
| 7,966,322 B2 | 6/2011 | Clover | |
| 8,019,679 B2 | 9/2011 | Bennett et al. | |
| 8,131,533 B2 | 3/2012 | Legault et al. | |

(Continued)

OTHER PUBLICATIONS

Office Action for U.S. Appl. No. 12/156,309, dated Nov. 30, 2011.

(Continued)

*Primary Examiner* — Kimberly Wilson
(74) *Attorney, Agent, or Firm* — Lowenstein Sandler LLP (57) ABSTRACT

A method and apparatus for creating reports using dimension trees. The method may include presenting trees of dimensions associated with one or more source databases, receiving a user selection of one of the dimension trees, and presenting a view of the selected dimension tree. The method may further include allowing a user to choose components of a report from the view of the selected dimension tree, and populating the report with data from the source databases.

18 Claims, 7 Drawing Sheets

(56) References Cited

U.S. PATENT DOCUMENTS

| | | | |
|---|---|---|---|
| 8,468,085 B1 | 6/2013 | Cao et al. | |
| 8,601,383 B2* | 12/2013 | Folting | G06F 17/246 |
| | | | 707/700 |
| 2001/0054034 A1 | 12/2001 | Arning et al. | |
| 2002/0070953 A1* | 6/2002 | Barg | G06Q 10/10 |
| | | | 715/700 |
| 2002/0183965 A1 | 12/2002 | Gogolak | |
| 2003/0139827 A1 | 7/2003 | Phelps | |
| 2003/0187716 A1* | 10/2003 | Lee | G06Q 10/06315 |
| | | | 705/7.25 |
| 2003/0204426 A1* | 10/2003 | Honarvar | G06Q 10/0637 |
| | | | 705/7.36 |
| 2004/0153435 A1 | 8/2004 | Gudbjartsson et al. | |
| 2005/0010565 A1 | 1/2005 | Cushing et al. | |
| 2005/0044079 A1 | 2/2005 | Abineri et al. | |
| 2005/0080802 A1 | 4/2005 | Cras et al. | |
| 2005/0091206 A1 | 4/2005 | Koukerdjinian et al. | |
| 2005/0192963 A1 | 9/2005 | Tschiegg et al. | |
| 2005/0216294 A1* | 9/2005 | Labow | G06Q 10/0833 |
| | | | 705/333 |
| 2005/0262047 A1 | 11/2005 | Wu | |
| 2006/0004830 A1 | 1/2006 | Lora et al. | |
| 2006/0031110 A1 | 2/2006 | Benbassat et al. | |
| 2006/0112070 A1* | 5/2006 | Ramos | 707/1 |
| 2006/0117057 A1 | 6/2006 | Legault et al. | |
| 2006/0149778 A1 | 7/2006 | Clover | |
| 2006/0195370 A1* | 8/2006 | Howarth | G06Q 10/087 |
| | | | 705/28 |
| 2006/0271884 A1 | 11/2006 | Hurst | |
| 2007/0030282 A1* | 2/2007 | Cash | G06Q 30/00 |
| | | | 345/581 |
| 2007/0055596 A1 | 3/2007 | Yankovich et al. | |
| 2007/0088689 A1* | 4/2007 | Cras | G06F 17/30398 |
| 2007/0130517 A1 | 6/2007 | Wu | |
| 2007/0156677 A1 | 7/2007 | Szabo | |
| 2007/0156718 A1 | 7/2007 | Hossfeld et al. | |
| 2007/0192143 A1 | 8/2007 | Krishnan et al. | |
| 2007/0192724 A1 | 8/2007 | Devore et al. | |
| 2007/0219972 A1 | 9/2007 | Cragun et al. | |
| 2007/0250466 A1 | 10/2007 | Imrapur et al. | |
| 2007/0255574 A1 | 11/2007 | Polo-Malouvier et al. | |
| 2007/0255681 A1 | 11/2007 | Tien et al. | |
| 2007/0282673 A1 | 12/2007 | Nagpal et al. | |
| 2008/0040309 A1 | 2/2008 | Aldridge | |
| 2008/0086716 A1 | 4/2008 | Devore et al. | |
| 2008/0133568 A1 | 6/2008 | Grosset et al. | |
| 2008/0133582 A1 | 6/2008 | Andersch et al. | |
| 2008/0175478 A1 | 7/2008 | Wentland et al. | |
| 2008/0215621 A1* | 9/2008 | Ravindran | G06Q 10/10 |
| 2008/0248875 A1 | 10/2008 | Beatty | |
| 2008/0294996 A1 | 11/2008 | Hunt et al. | |
| 2008/0307430 A1 | 12/2008 | Friedlander et al. | |
| 2009/0006455 A1 | 1/2009 | Carroll | |
| 2009/0012983 A1 | 1/2009 | Senneville et al. | |
| 2009/0018996 A1 | 1/2009 | Hunt et al. | |
| 2009/0037236 A1* | 2/2009 | Miller | G06Q 10/06 |
| | | | 705/7.29 |
| 2009/0055467 A1 | 2/2009 | Petersen | |
| 2009/0193050 A1 | 7/2009 | Olson | |
| 2009/0193217 A1* | 7/2009 | Korecki | G06Q 10/087 |
| | | | 711/170 |
| 2009/0222470 A1 | 9/2009 | Kemp et al. | |
| 2009/0259501 A1 | 10/2009 | Poissant | |
| 2009/0300533 A1 | 12/2009 | Williamson | |
| 2010/0057684 A1 | 3/2010 | Wiliamson | |
| 2010/0057764 A1 | 3/2010 | Williamson | |
| 2010/0125813 A1 | 5/2010 | Choudhury | |
| 2010/0138449 A1 | 6/2010 | Williamson | |
| 2010/0332583 A1 | 12/2010 | Szabo | |

OTHER PUBLICATIONS

Notice of Allowance for U.S. Appl. No. 12/202,077, dated Nov. 25, 2011.
Red Hat Notice of Allowance for U.S. Appl. No. 12/156,309, dated Jan. 30, 2014.
Red Hat Notice of Allowance for U.S. Appl. No. 12/074,035, dated May 7, 2014.
Red Hat Notice of Allowance for U.S. Appl. No. 12/202,085, dated Jun. 5, 2014.
Red Hat Notice of Allowance for U.S. Appl. No. 12/074,035, dated May 24, 2010.
Red Hat Office Action for U.S. Appl. No. 12/156,309, dated Jun. 23, 2011.
Red Hat Office Action for U.S. Appl. No. 12/202,085, dated Jan. 3, 2011.
Red Hat Office Action for U.S. Appl. No. 12/202,085, dated Jul. 18, 2011.
Red Hat Office Action for U.S. Appl. No. 12/325,235, dated Sep. 22, 2011.
Red Hat Office Action for U.S. Appl. No. 12/202,077, dated Feb. 17, 2011.
Red Hat Office Action for U.S. Appl. No. 12/202,077, dated Aug. 3, 2011.
Shapiro, Adam, Analysis Services: Choosing Dimension Types in SQL Server 2000 Analysis Services, Jul. 19, 2001, Microsoft, 1-15.
Notice of Allowance for U.S. Appl. No. 12/202,085, dated Sep. 27, 2011.
Microsoft SQL Server 2005, "Mining SQL Server 2005 Data Mining Add-Ins for Office 2007," 2007, 11 pages, accessed onlne at <http://www.sqlserverdatamining.com/ssdm/Home/DataMiningAddinsLaunch/tabid/69/Default.aspx> on Sep. 22, 2011.

* cited by examiner

CREATING REPORTS USING DIMENSION TREES

RELATED APPLICATIONS

This application is related to U.S. patent application Ser. No. 12/074,035, filed on Feb. 29, 2008, Ser. No. 12/156,309, filed on May 31, 2008, U.S. patent application Ser. No. 12/202,077, entitled "Building Custom Dimension Trees" filed on Aug. 29, 2008, and U.S. patent application Ser. No. 12/202,085, entitled "Real Time Datamining" filed on Aug. 29, 2008, and assigned to the assignee of the present application and hereby incorporated by reference.

TECHNICAL FIELD

Embodiments of the present invention relate to data warehousing, and more specifically, to creating reports using dimension trees.

BACKGROUND

Data stored in a database is usually transactional in nature. A database may be a transactional database or a relational database. Transactional databases simply are a collection of transaction tables. Relational databases add the capacity to match tables together and perform other functions. Since relational databases provide ways to match and organize data, more insight can be achieved through them. Hence, most databases systems by default are relational (encompassing the transactional as well as relational capacity). These databases are intended to contain data in a format that will allow it to be completely matchable with other data in the database or other outside databases. However, this data is not organized in a manner where the natural relationships become apparent or easily utilized. Rather, the relationships in the data are defined and maintained by the application running on top of the database. An individual can only see the relationships in the data if he or she already has an understanding of the database structure and the application functionality.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for creating reports using dimension trees. In one embodiment, a user interface is provided that presents a list of trees of dimensions associated with one or more source databases, facilitates user selection of a dimension tree from the list, and presents a view of the selected dimension tree to a user. The dimension tree may include individual dimensions or subtrees of dimensions. The user can then use the view of the dimension tree to build a report. In particular, the user can be presented with a report template having multiple components (e.g., the title, report parameters, column names and row names) and be allowed to choose dimensions or subtrees presented in the view for the relevant components of the report. When all components are specified, the report can be populated with respective data from the source databases.

One advantage of the embodiments described herein is that they simplify the creation of reports for end users by providing dimension trees that capture the natural relationships of data. Different views of dimension trees are provided to allow end users to choose data relationships that are the most appropriate for the report being built.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
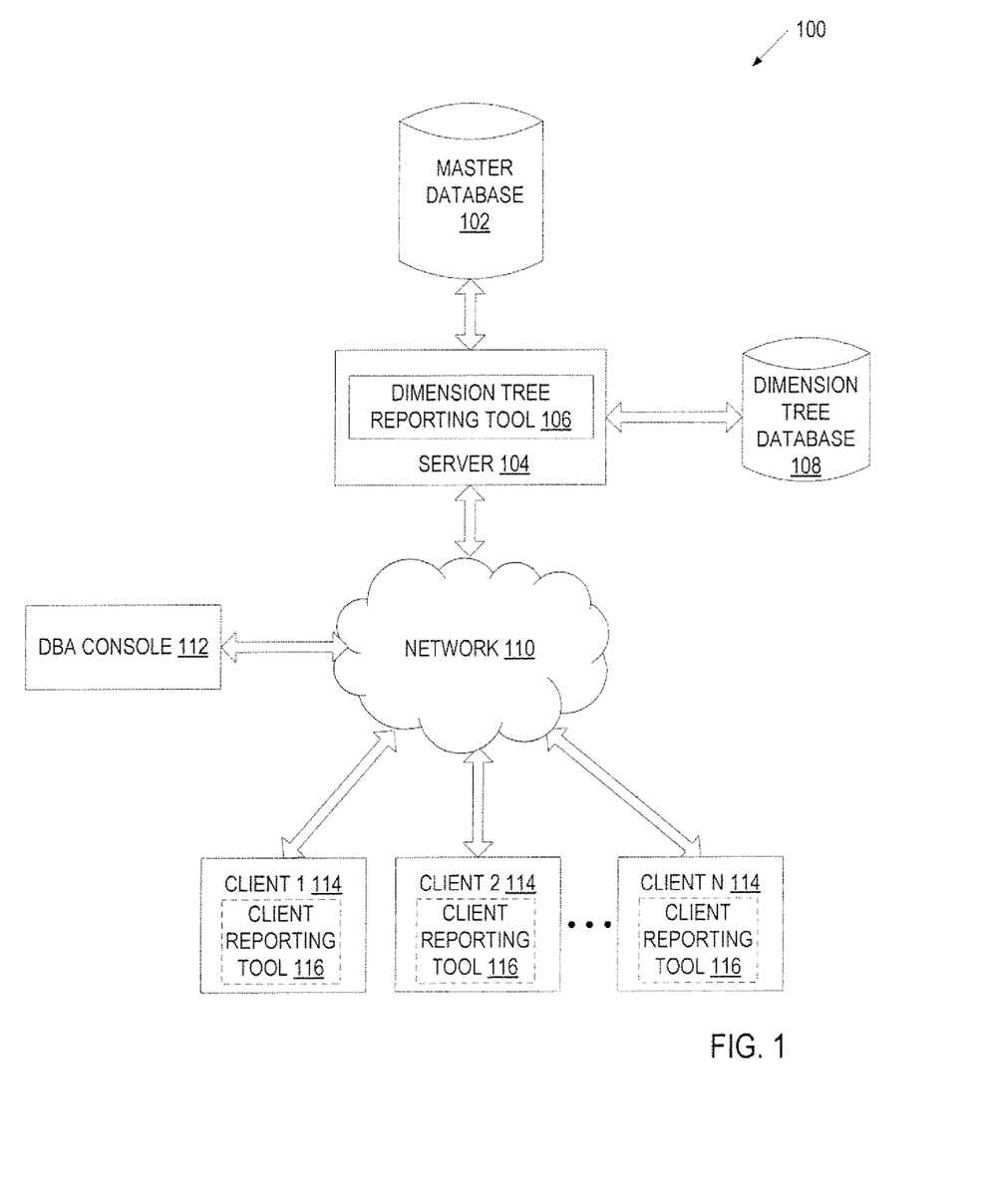
FIG. 1 illustrates a network architecture in which embodiments of the present invention may be implemented.

FIG. 1 illustrates an exemplary network architecture 100 in which embodiments of the present invention may operate. The network architecture 100 may include client devices (clients) 114, a server 104, a DBA console 112, and a network 110. The clients 114 may be, for example, personal computers (PCs), mobile phones, palm-sized computing devices, personal digital assistants (PDAs), and the like.

The server 104 may be, for example, a server computer, a PC, or any other machine. The server 104 may be coupled to the clients 114 via the network 110, which may be a public network (e.g., Internet) or a private network (e.g., Ethernet, a Local Area Network (LAN), or a corporate intranet). In addition, the server 104 may be coupled to a console 112 via the network 110. The console 112 may be operated by a DBA and may be, for example, a PC, a PDA, a mobile phone, etc. The console 112 may contain hardware components and software components including a browser application to render data provided by the server 104.

The server 104 may be coupled to a master database 102 which may reside on one or more storage devices. The server 104 may access the master database 102 directly or via a network (e.g., a private or public network). The master database 102 may represent one or more production databases of an organization or multiple organizations. A production database may be a large relational or transactional database.

The server 104 may host a dimension tree reporting tool 106 that utilizes a dimension tree database 108 to assist end users (users of clients 114) with the creation of various reports. The dimension tree database 108 may reside on one or more storage devices and may be accessible to the dimension tree reporting tool 106 via a network (private or public network) or directly. The dimension tree database 108 is populated by a DBA to transform data from the master database 102 using natural relationships of data stored in the master database 102 and the joining power inherent in the relational features of the master database 102. In particular, the ETL database 108 is populated using dimensions and dimension trees. Dimensions are defined from data elements of the master database 102 and are organized into dimension trees. A dimension tree combines individual dimensions that are related to each other (e.g., dimensions "year," "month" and "day" may be combined into a tree "date"). In addition, a dimension tree may combine individual dimensions with some other dimension trees (e.g., a dimension tree "date" may be combined with dimensions "hour," "minute" and "second" into a dimension tree "date/time"). A constituent dimension tree added to a main dimension tree is referred to herein as a sub-tree. Further, a dimension tree may include an element created for this specific dimension tree. Such an element is a constituent of a regular dimension that needs to be added on equal tooting with some of the included dimensions. For example, a dimension tree of "Contacts" may include a dimension for customers (including parent and child customers), but may add the element titled "stock holder" to account for any unnamed stockholder activity.

In one embodiment, the dimension tree database 108 defines the relationships between the dimension trees using a pyramid model, where the top of the pyramid contains only a few dimension tree roots and the base of the pyramid contains the largest number of dimension tree leaves. The dimension tree database 108 includes a separate table for each level of the pyramid. As a result, analysis or reporting can start at the top of the pyramid and drill down closer to the base of the pyramid. Alternatively, analysis or reporting can start at any level of the pyramid and move downward.

The dimension tree reporting tool 106 allows an end user to choose a specific pyramid level, and displays dimension trees and dimensions associated with this pyramid level. Upon a user selection of a dimension tree for a report, the dimension tree reporting tool 106 presents the dimension tree to a user. As will be discussed in more detail below, the dimension tree reporting tool 106 may display the dimension tree to the user using various predefined views. The views organize dimensions and sub-trees inside a dimension tree in different ways based on multiple relationships a dimension or a sub-tree may have with other constituents of the dimension tree. For example, the tree "Customer" may be viewed based on systems within an organization that maintain data about customers (e.g., Sugar CRM, Oracle ERP, Datasoft system, etc.). Alternatively, the tree "Customer" may be viewed based on a customer status (e.g., future customer, current customer, inactive customer, et.). The views may be created by a DBA based on common reporting requirements of various users.

The dimension tree reporting tool 106 may allow a user to choose the view that is most suitable for the report being built. Once the view is presented, the user can select dimensions and sub-trees from the view for relevant components of the report (e.g., title, parameters, column names, row names, etc.), and submit a request to populate the report. The dimension tree reporting tool 106 then populates the report with data from the master database 102.

In one embodiment, the dimension tree reporting tool 106 performs all of the above functionality, interacting with a web browser hosted by the client 114 to receive user input and return requested data. In another embodiment, the client 114 hosts a client reporting tool 116 that cooperates with the dimension tree reporting tool 106 to provide the above functionality to the end user. For example, the client reporting tool 116 may maintain a copy of the dimension tree database 108 locally and utilize this local database to assist in the user's creation of the report. Upon receiving the user's request to populate the report with data, the client reporting tool 116 may pass this request to the dimension tree reporting tool 106.

Figure 2:
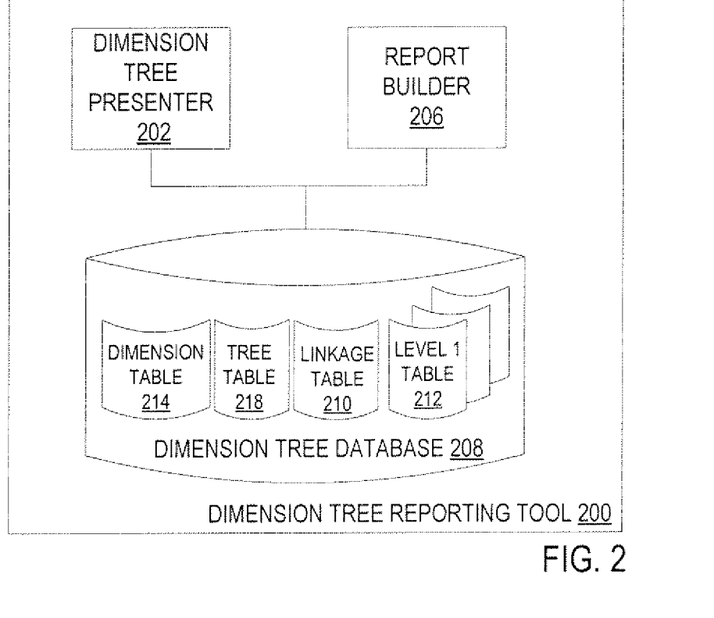
FIG. 2 illustrates a block diagram of one embodiment of a dimension tree reporting tool.

FIG. 2 is a block diagram of one embodiment of a dimension tree reporting tool 200. The dimension tree reporting tool 200 may include a dimension tree presenter 202, a report builder 206, and a reporting database 208.

The dimension tree database 208 may include various mapping tables such as a dimension table 214, a tree table 218, a linkage table 210, and a set of level tables 212. The dimension table 214 specifies dimensions created by the DBA and stores the mappings between the production data fields and the dimensions. The tree table 218 specifies information about dimension trees created by the DBA. This information may include, for example, the name of the dimension tree and identifiers of its constituents (e.g., dimensions, other dimension trees, and/or unique elements). In addition, the tree table 218 may specify views created by the DBA for each dimension tree (e.g., the name of the views and corresponding SQL statements). Each level table 212 corresponds to a specific level of the reporting pyramid and lists dimension trees and dimensions associated with this pyramid level. The linkage table 210 stores relationships between the tables 212.

The dimension tree presenter 202 provides a user interface that facilitates user input of a desired pyramid level for a report being built, and displays a list of dimension trees and/or dimensions associated with the desired pyramid level. Upon user selection of a dimension tree, the dimension tree presenter 202 allows a user to select a view suitable for the report, and displays the selected view.

The report builder 206 allows the user to choose (e.g., via a drag-and-drop operation) dimensions, sub-trees and/or elements presented in the view for relevant components of the report (e.g., title, parameters, column names, row names, etc.). In one embodiment, the user can also choose, for the report components, dimensions that are associated with the desired pyramid level but are not included in the dimension tree. Exemplary user interfaces will be discussed in more detail below in conjunction with FIGS. 4A through 4C.

Figure 3:
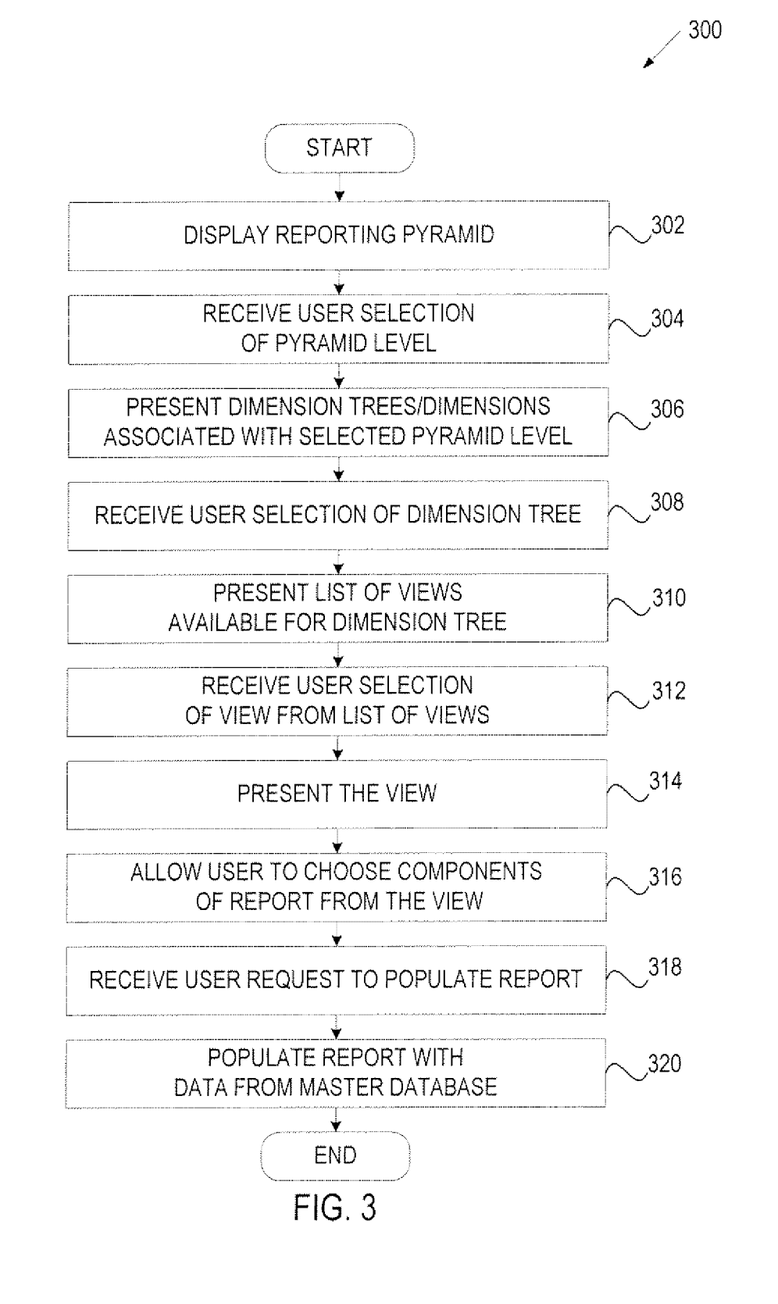
FIG. 3 illustrates a flow diagram of one embodiment of a method for creating a report using a dimension tree.

FIG. 3 illustrates a flow diagram of one embodiment of a method 300 for creating a report using a dimension tree. The process 300 may be performed by processing logic that may comprise hardware (e.g., circuitry, dedicated logic, programmable logic, microcode, etc.), software (such as instructions run on a processing device), or a combination thereof. In one embodiment, the process 300 is performed by a dimension tree reporting tool 106 or a combination of the dimension tree reporting tool 106 and a client reporting tool 116 of FIG. 1.

Referring to FIG. 3, method 300 begins with processing logic displaying a reporting pyramid (block 302). At block 304, processing logic receives user selection of a desired pyramid level for a report being built (block 304). At block 306, processing logic presents a list of dimension trees and/or dimensions associated with the desired pyramid level.

At block 308, processing logic receives user selection of a dimension tree from the list. At block 310, processing logic presents a list of views available for the selected dimension tree. At block 312, processing logic receives user input identifying the selected view.

At block 314, processing logic presents the view of the dimension tree to the user. The user may decide that the view is not suitable for the report and ask for another view. Processing logic may then repeat blocks 310 through 314 until the user is satisfied.

At block 316, processing logic allows the user to choose components of the report from the view of the dimension tree (e.g., by dragging sub-trees and/or dimensions presented in the view to corresponding components of the report and dropping them at those components). When the user is done with the view of the dimension tree, processing logic may allow the user to select, for the remaining components of the report, dimensions that are associated with the desired pyramid level but are not included in the dimension tree.

At block 318, processing logic receives a user request to populate the report with data. At block 320, processing logic generates a query (e.g., an SQL statement) based on the selected components of the report, submits the query to the master database, and populate the report with the returned data.

Figure 4A:
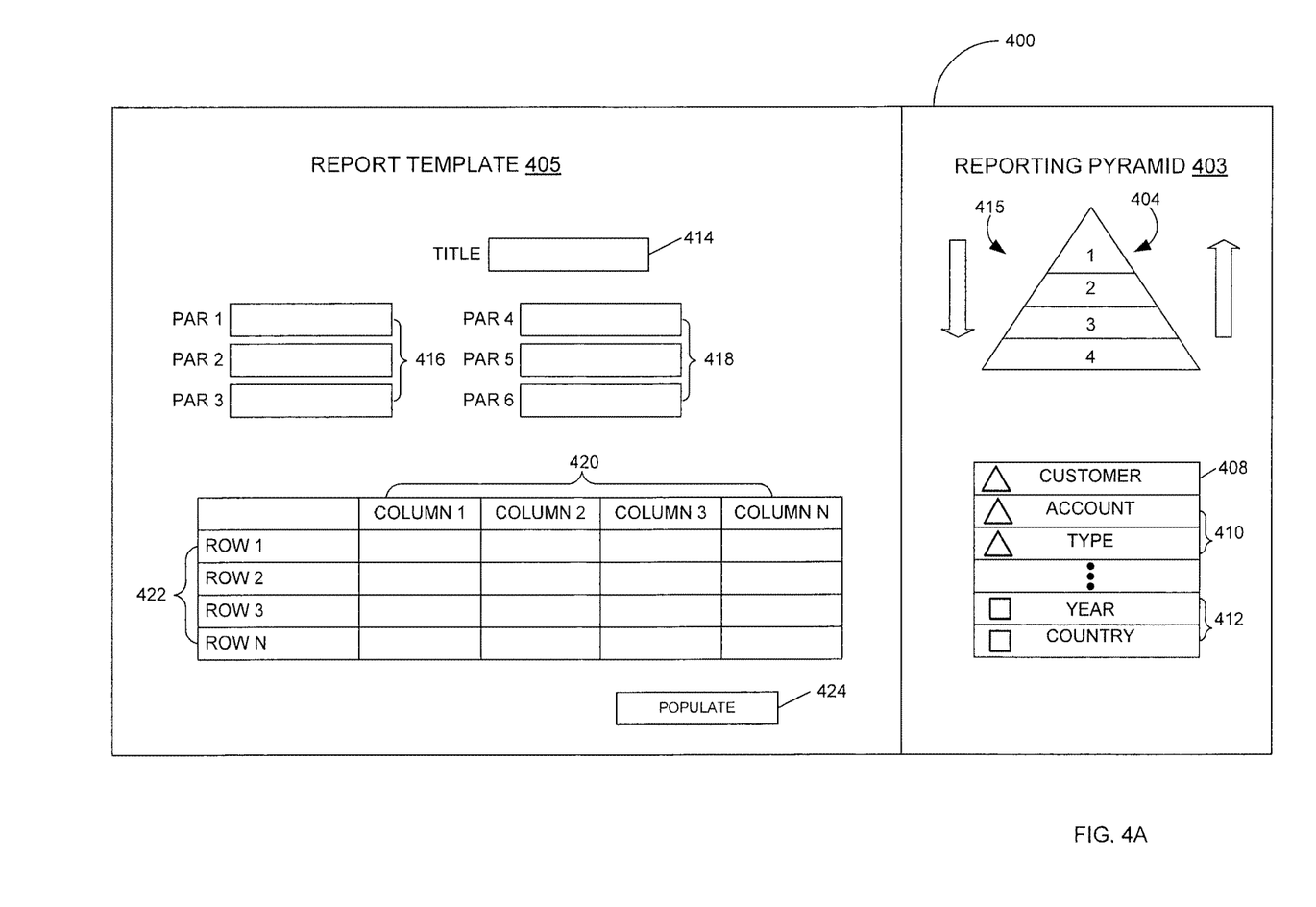
FIGS. 4A through 4C illustrate exemplary user interfaces provided by a dimension tree reporting tool, in accordance with one embodiment of the invention.
Figure 4B:
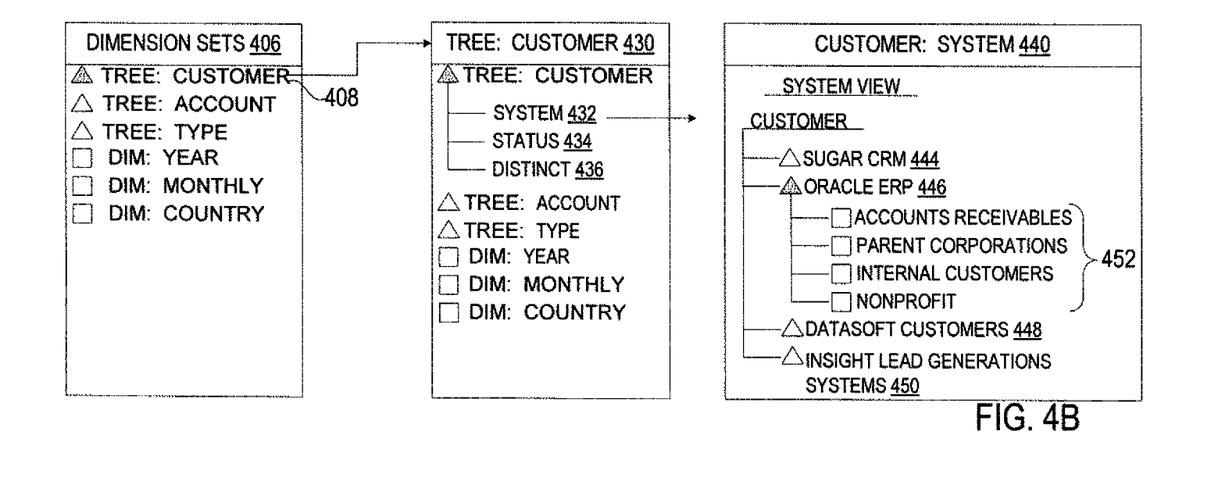
Figure 4C:
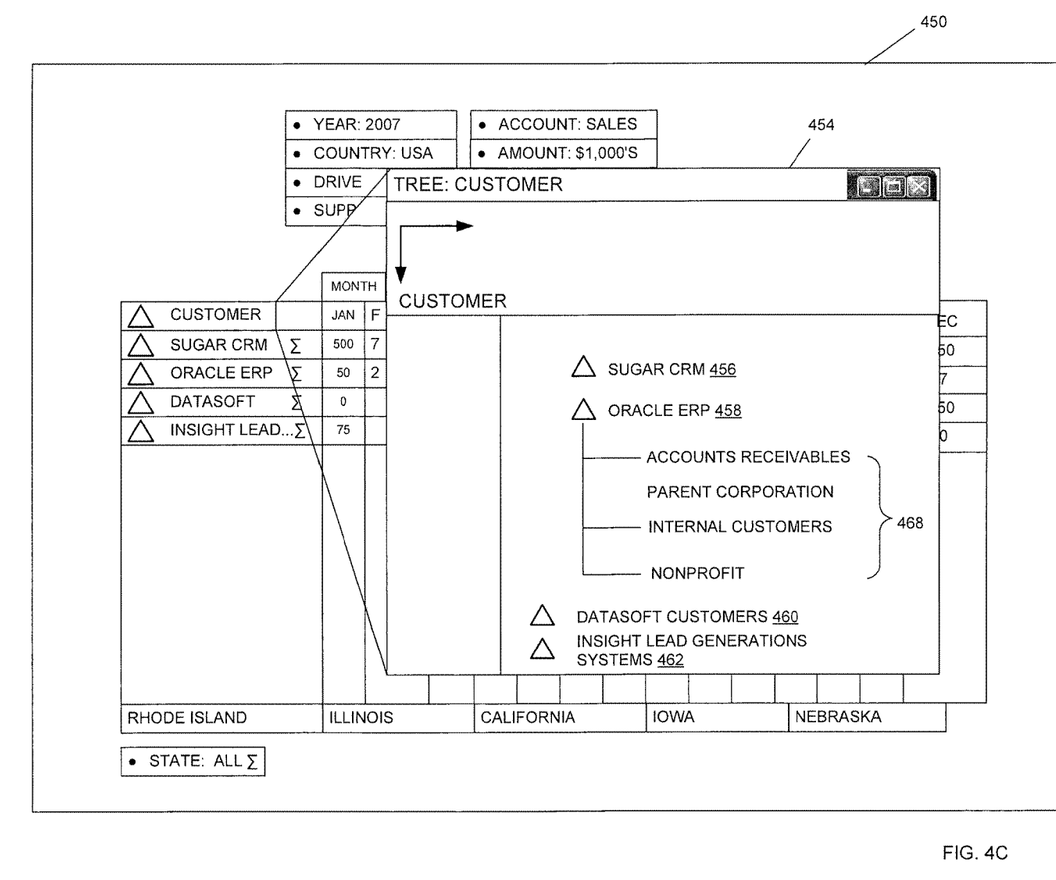

FIGS. 4A through 4C illustrate exemplary UIs provided by a dimension tree reporting tool, in accordance with one embodiment of the invention. Referring to FIG. 4A, a report builder UI 400 includes a report template area 405 and a reporting pyramid area 403. The report template area 405 consists of report components such as title 414, report parameters 416 and 418, column names 420 and row names 422. The reporting pyramid area 403 includes a reporting pyramid 415. Upon user selection of pyramid level 404, dimension sets 406 associated with the pyramid level 404 are displayed. The dimension sets 406 includes dimension trees 408 and 410 and individual dimensions 412. As shown, the user selects dimension tree 408 for the report.

Referring to FIG. 4B, upon the user selection of the dimension tree 408, a pop-up window 430 appears listing views 432, 434 and 436 available for the dimension tree 408 "Customer." View "System" 432 organizes data in the context of specific systems within the organization. View "Status" 434 organizes data in the context of the customer status (e.g., future customer, current customer, inactive customer, etc.). View "Distinct" 436 is focused on customers that do not match across the different systems.

Upon user selection of the view 432, the System view 440 of the Customer dimension tree 408 appears. The Customer dimension tree 408 includes sub-trees 444, 446, 448 and 450. The user can select a sub-tree (e.g., sub-tree 446) to see dimensions inside the sub-tree (e.g., dimensions 452). The user can then drag and drop sub-trees and/or dimensions to desired components 414 through 422 of the report. When all components of the report are specified, the user can submit a request to populate the report (e.g., by activating button 424).

Referring to FIG. 4C, UI 450 illustrates the report that has been built and populated with data. The user has clicked on the Customer tree object 452, resulting in a popup window 454 displaying the System view used for the report. The System view shows sub-trees of systems 456, 458, 460 and 462, with the sub-tree 458 extended to show the underlying dimensions 468. The user can select the sub-tree 458 in the popup window 454 to replace the current Customer tree 452 (e.g., via a double click or a drag-and-drop operation). In response, the report no longer displays the Customer tree 452. Instead, the report displays the Oracle ERP sub-tree 458, with row names corresponding to dimensions 468 inside the Oracle ERP sub-tree 468. The user can then re-populate the report to provide detailed information about customers associated with Oracle ERP.

Figure 5:
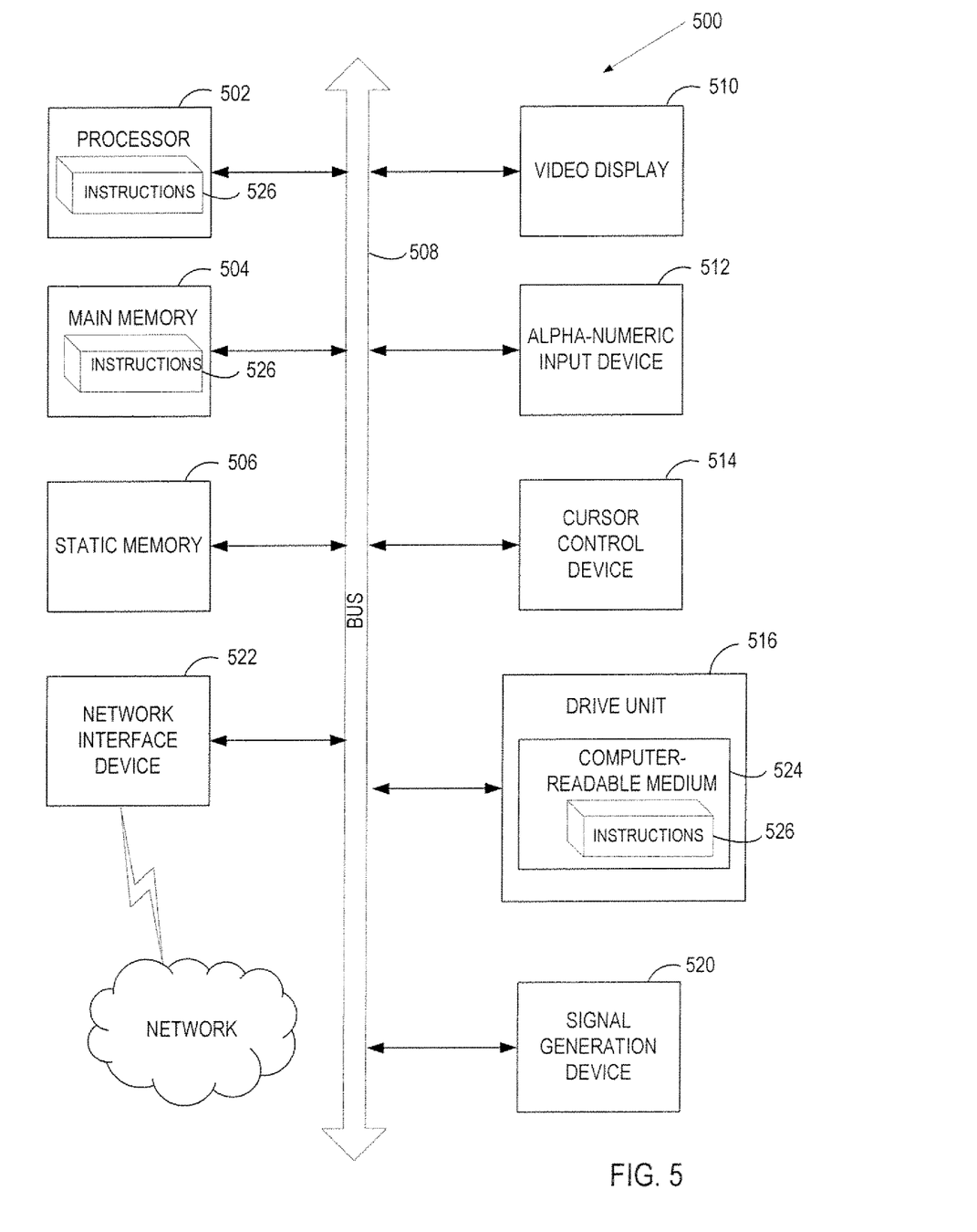
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions (e.g., software 526) embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-readable storage media. The software 526 may further be transmitted or received over a network 520 via the network interface device 522.

The machine-readable storage medium 531 may also be used to store dimension tree mapping data (e.g., dimension tree database 108 or 208 of FIGS. 1 and 2). While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
providing a pyramid model comprising a plurality of levels corresponding to a plurality of sets of dimension trees;
receiving a selection of a level of the plurality of levels;
providing, by a processing device, a plurality of dimension trees from the set of dimension trees corresponding to the selected level and that are associated with one or more databases;
receiving a selection of one of the plurality of dimension trees;
providing a plurality of views of the selected dimension tree, the plurality of views specifying different organizations of data associated with the selected dimension tree;
receiving a selection of one of the plurality of views of the selected dimension tree;
providing the selected view of the selected dimension tree;
allowing components of a report to be individually chosen from the selected view of the selected dimension tree by a placement of dimensions of the selected dimension tree on areas of the report;
generating a query in view of the components of the report that are individually chosen by the placement of the dimensions of the selected dimension tree on the areas of the report;
populating, by the processing device, the report with data returned from the one or more databases in view of the query, using the individually chosen components, wherein the report identifies the selected dimension tree;
receiving a selection of the selected dimension tree identified in the report; and
in response to the selection of the selected dimension tree identified in the report, providing additional dimension trees associated with the selected dimension tree to populate the report with additional data from a corresponding additional dimension tree.

2. The method of claim 1, further comprising:
providing one or more independent dimensions pertaining to the selected level, the independent dimensions not being a part of the selected dimension tree; and allowing a providing of any of the independent dimensions for the components of the report.

3. The method of claim 1 wherein providing the selected view of the selected dimension tree comprises:
providing a plurality of predefined views of the selected dimension tree; and
allowing a specification of a desired view of the selected dimension tree.

4. The method of claim 1 wherein the selected dimension tree comprises one or more subtrees of dimensions and one or more individual dimensions.

5. The method of claim 4 wherein providing the selected view of the selected dimension tree comprises:
providing subtrees and individual dimensions located at the top of the dimension tree; and
allowing a view of dimensions of the subtrees and hierarchies within individual dimensions.

6. The method of claim 5 wherein allowing to choose components of a report from the selected view of the selected dimension tree comprises:
allowing a selection, for the components of the report, one or more subtrees, dimensions of the subtrees, individual dimensions, and elements within the individual dimensions.

7. The method of claim 1 wherein the placing of the dimensions of the selected dimension tree on the areas of the report corresponds to a drag-and-drop operation.

8. The method of claim 1 wherein the components of the report comprise a title, at least one parameter, at least one column name, and at least one row name.

9. A system comprising:
a memory to store a plurality of dimension trees associated with one or more databases;
a processing device, operatively coupled with the memory, to:
provide a pyramid model comprising a plurality of levels corresponding to a plurality of sets of dimension trees;
receive a selection of a level of the plurality of levels;
provide the plurality of dimension trees from the set of dimension trees corresponding to the selected level and that are associated with the one or more databases;
receive a selection of one of the plurality of dimension trees;
provide a plurality of views of the selected dimension tree, the plurality of views specifying different organizations of data associated with the selected dimension tree;
receive a selection of one of the plurality of views of the selected dimension tree;
provide the selected view of the selected dimension tree;
allow components of a report to be individually chosen from the selected view of the selected dimension tree by a placement of dimensions of the selected dimension tree on areas of the report;
generate a query in view of the components of the report that are individually chosen by the placement of the dimensions of the selected dimension tree on the areas of the report;
populate the report with data returned from the one or more databases in view of the query, using the individually chosen components, wherein the report identifies the selected dimension tree;
receive a selection of the selected dimension tree identified in the report; and
in response to the selection of the selected dimension tree identified in the report, provide additional dimension trees associated with the selected dimension tree to populate the report with additional data from a corresponding additional dimension tree.

10. The system of claim 9 wherein to provide the selected view of the selected dimension tree, the processing device is to:
provide a plurality of predefined views of the selected dimension tree; and
allow a specification of a desired view of the selected dimension tree.

11. The system of claim 9 wherein the selected dimension tree comprises one or more subtrees of dimensions and one or more individual dimensions.

12. The system of claim 11 wherein to provide the selected view of the selected dimension tree, the processing device is to:
provide subtrees and individual dimensions located at the top of the dimension tree; and
allow a view of dimensions of the subtrees and hierarchies within individual dimensions.

13. The system of claim 12 wherein to allow the choosing of components of the report from the selected view of the selected dimension tree, the processing device is to:
allow a selection, for the components of the report, one or more subtrees, dimensions of the subtrees, individual dimensions, and elements within the individual dimensions.

14. The system of claim 9 wherein the components of the report comprise a title, at least one parameter, at least one column name, and at least one row name.

15. A non-transitory computer readable storage medium comprising instructions that, when executed by a processing device, cause the processing device to:
provide a pyramid model comprising a plurality of levels corresponding to a plurality of sets of dimension trees;
receive a selection of a level of the plurality of levels;
provide a plurality of dimension trees from the set of dimension trees corresponding to the selected level and that are associated with one or more databases;
receive a selection of one of the plurality of dimension trees;
provide a plurality of views of the selected dimension tree, the plurality of views specifying different organizations of data associated with the selected dimension tree;
receive a selection of one of the plurality of views of the selected dimension tree;
provide the selected view of the selected dimension tree;
allow, by the processing device, components of a report to be individually chosen from the selected view of the selected dimension tree by a placement of dimensions of the selected dimension tree on areas of the report;
generate a query in view of the components of the report that are individually chosen by the placement of the dimensions of the selected dimension tree on the areas of the report;
populate the report with data returned from the one or more databases in view of the query, using the individually chosen components, wherein the report identifies the selected dimension tree;
receive a selection of the selected dimension tree identified in the report; and
in response to the selection of the selected dimension tree identified in the report, provide additional dimension trees associated with the selected dimension tree to populate the report with additional data from a corresponding additional dimension tree.

16. The non-transitory computer readable storage medium of claim 15 wherein to provide the selected view of the selected dimension tree, the processing device is to:
   provide subtrees and individual dimensions located at the top of the dimension tree; and
   allow a view of the dimensions of subtrees and hierarchies within individual dimensions.

17. The non-transitory computer readable storage medium of claim 16 wherein to allow the choosing of components of the report from the selected view of the selected dimension tree, the processing device is to:
   allow a selection, for the components of the report, one or more subtrees, dimensions of the subtrees, individual dimensions, and elements within the individual dimensions.

18. The non-transitory computer readable storage medium of claim 15 wherein the components of the report comprise a title, at least one parameter, at least one column name, and at least one row name.

\* \* \* \* \*